US012304695B2

(12) United States Patent
Doutt et al.

(10) Patent No.: US 12,304,695 B2
(45) Date of Patent: May 20, 2025

(54) SYSTEM AND METHOD FOR CONSTRUCTING A THREE-DIMENSIONAL DISCARD CUP

(71) Applicant: Seed Cup LLC, Farmington, UT (US)

(72) Inventors: Daniel Doutt, Farmington, UT (US); Cameron J Nielsen, Orem, UT (US); Brandon Dalton, Provo, UT (US)

( * ) Notice: Subject to any disclaimer, the term of this patent is extended or adjusted under 35 U.S.C. 154(b) by 336 days.

(21) Appl. No.: 17/579,050

(22) Filed: Jan. 19, 2022

(65) Prior Publication Data

US 2022/0227539 A1 Jul. 21, 2022

Related U.S. Application Data

(60) Provisional application No. 63/139,404, filed on Jan. 20, 2021.

(51) Int. Cl.

*B65D 33/00* (2006.01)
*B31B 50/26* (2017.01)
*B65D 5/02* (2006.01)
*B65D 5/42* (2006.01)
*B65D 30/22* (2006.01)
*B31B 100/00* (2017.01)

(52) U.S. Cl.

CPC .............. *B65D 31/12* (2013.01); *B31B 50/26* (2017.08); *B65D 5/0209* (2013.01); *B65D 5/4266* (2013.01); *B31B 2100/002* (2017.08)

(58) Field of Classification Search

CPC .... B65D 31/12; B65D 5/0209; B65D 5/4266; B31B 50/26; B31B 2100/002

USPC .......................................................... 383/40

See application file for complete search history.

(56) References Cited

U.S. PATENT DOCUMENTS

| | | | | | |
|---|---|---|---|---|---|
| 652,350 | A | * | 6/1900 | Davenport | A47F 13/08 294/180 |
| 2,820,491 | A | * | 1/1958 | Kromsten | B65D 5/76 141/381 |
| 3,146,914 | A | * | 9/1964 | Eckley | B65D 5/76 222/541.6 |
| 3,617,311 | A | * | 11/1971 | Beltle | B65D 85/816 206/217 |
| D233,158 | S | * | 10/1974 | Lowe, Jr. | 294/1.3 |
| 4,249,693 | A | * | 2/1981 | Diaz | B65D 5/76 206/229 |
| 4,251,097 | A | * | 2/1981 | Whitten, II | E01H 1/1206 294/1.3 |
| 4,641,752 | A | * | 2/1987 | Palffy | A47G 21/001 206/583 |

(Continued)

*Primary Examiner* — Peter N Helvey

(74) *Attorney, Agent, or Firm* — Accelerate IP LLC

(57) ABSTRACT

An article of manufacture for use in constructing a three-dimensional discard cup comprising a substantially square flexible substrate having a front side and back side, a first corner, a second corner, a third corner and a fourth corner. A center and two pairs of opposing corners, wherein the flexible substrate having diagonal mirror image cut lines in the shape of an L, a score line diagonal near the first corner and the third corner. A first wall is created by folding inward along the first score line and the flexible substrate is rotated 180 degrees preparing for the next fold along the second score line. A second wall is created by folding inward along the second score line, and the first wall the second wall are formed creating a pouch.

9 Claims, 16 Drawing Sheets

(56) References Cited

U.S. PATENT DOCUMENTS

| | | | | | |
|---|---|---|---|---|---|
| 4,646,470 | A * | 3/1987 | Maggio | A01G 23/04 | 47/76 |
| 5,115,966 | A * | 5/1992 | McKibben | B65D 5/76 | 229/125.17 |
| 5,294,467 | A * | 3/1994 | Hoodes | A47J 43/282 | 425/281 |
| 5,551,629 | A * | 9/1996 | Fujimoto | B65D 5/727 | 229/125.17 |
| 5,842,630 | A * | 12/1998 | Remer | B65D 5/2042 | 229/116 |
| 6,247,735 | B1 * | 6/2001 | Berkman | E01H 1/1206 | 294/1.3 |
| 6,735,925 | B2 * | 5/2004 | Weder | A47G 7/085 | 493/410 |
| 9,869,575 | B2 * | 1/2018 | Cross | B65D 51/247 | |
| 2002/0014524 | A1 * | 2/2002 | Willis | B65D 5/3685 | 229/190 |
| 2003/0222465 | A1 * | 12/2003 | Fonfrias | E01H 1/1206 | 294/1.3 |
| 2004/0182978 | A1 * | 9/2004 | Lozano | A47G 23/0225 | 248/300 |
| 2005/0258655 | A1 * | 11/2005 | Matthews | E01H 1/1206 | 294/1.3 |
| 2009/0114710 | A1 * | 5/2009 | Lang | B65D 3/20 | 229/404 |
| 2014/0238987 | A1 * | 8/2014 | Brooks | B65D 51/246 | 493/405 |
| 2020/0369429 | A1 * | 11/2020 | Aittamaa | B65D 5/0209 | |
| 2023/0192351 | A1 * | 6/2023 | Song | A47G 19/2205 | 229/405 |

* cited by examiner

SYSTEM AND METHOD FOR CONSTRUCTING A THREE-DIMENSIONAL DISCARD CUP

CROSS-REFERENCE TO RELATED APPLICATIONS

This application claims benefit from currently pending U.S. Provisional Application No. 63/139,404 titled "system and method for constructing a three-dimensional" and having a filing date of Jan. 20, 2021, all of which is incorporated by reference herein.

FIELD OF THE INVENTION

The present specification relates to a construction cup and more specifically to a spit cup wherein a bag is foldable bearing a sequentially coded pairs of indicia pairs are folded and creased in a predetermined order to form a discard bag.

BACKGROUND OF THE INVENTION

Origami, the oriental game of constructing objects by folding sheets of material, has been known for many centuries. Origami involves manipulating a sheet of foldable material by folding and creasing selected edges and corners into or on another in a certain sequence of steps to form a three-dimensional article. Geometric shapes, toys, games, figures, and containers configurations are among the finished articles which may be constructed by folding and creasing a sheet of foldable material in a set sequential fashion wherein the set sequence determines the finished article.

More recently, it has been recognized that origami has applications other than just folding and creasing a sheet of material. For example, origami is used for in product design to allow for larger items to fold into themselves making a smaller item, or a corrugated box which can fold into a drink holder or a box carton. A particular advantage of such items is that they allow the item to be easily stored or transported. In addition, a particular advantage of these type of products is that they are relatively inexpensive, involving only a generally readily available sheet of material, such as paper, corrugated box, or similar foldable material and requiring no special implements.

Many products contain a portion of the product that is to be consumed, and a portion of the product that is meant to be discarded. Examples can include peanuts in the shell, pistachios, sunflower seeds, or other products that are individually wrapped. Consumers of these products will typically use or eat the consumable portion and hold the discard portion in a hand, pocket, or a separate bag or cup. A need therefore exists for a discard bag that is specifically designed to transform from a discard bag, or a material provided with a discard bag to a spit cup using origami.

An object of the present invention is to allow a discard cup to easily be stored in a bag, or as a component of the bag wherein the user can easily create a discard cup for discardable material without taking unnecessary space within the original bag.

BRIEF SUMMARY OF THE INVENTION

A system and method for packaging and distributing a product that is a plurality of individual pieces is provided. Each individual piece will have a consumable portion and a disposable portion and will be held in a container like a cardboard box or a plastic bag. A disposal cup to hold the disposable portion of the pieces is formed by folding a semi-stiff foldable substrate along scored lines to create the three-dimensional structure of the disposal cup. The foldable substrate may be provided loose in a bag, for example, of individual pieces, or may be stapled or tied to the outside of the bag. The bag may also include a pocket on the outside of the bag that houses the foldable substrate.

The foldable substrate may be any semi-stiff, foldable material such as paper, laminated material, or cardstock. The substrate may be cut to more easily allow the foldable substrate to be folded into the three-dimensional structure. In some embodiments, the substrate includes a base portion and a plurality of extensions from the base portion that are folded in upon the base structure or woven together to create a disposal container. At least one slot and at least one tab may be included on the substrate, and the tab may be inserted into the slot when the substrate is folded in the desired three-dimensional pattern. In a particular embodiment, the slot is formed from an extension that is folded back against the base portion. The friction between the tab and the slot can hold the substrate in the desired three-dimensional pattern. The substrate alternatively or additionally may comprise a glue portion configured to hold the substrate in the desired three-dimensional pattern when the substrate is folded. The glue is pre-applied to the substrate and sold to the consumer ready to be glued together.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of molding a fishing lure, without also reciting in such phrases any structure, material or act in support of the function. Thus, even when the claims recite a "means for performing the function of molding a fishing lure, step for performing the function of molding a fishing lure," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In certain construction situations, the operator must execute a special instruction in order to proceed with the next step in the construction sequence herein. The special instruction may require that an edge be scored and then unfolded, or that a flap be extracted from within a portion of a partially constructed item. Operation of creating a discard pouch and of the preceding manipulative features will be more clearly illustrated with reference to the following examples which describe the steps required to construct the completed a discard pouch.

Figure 1:
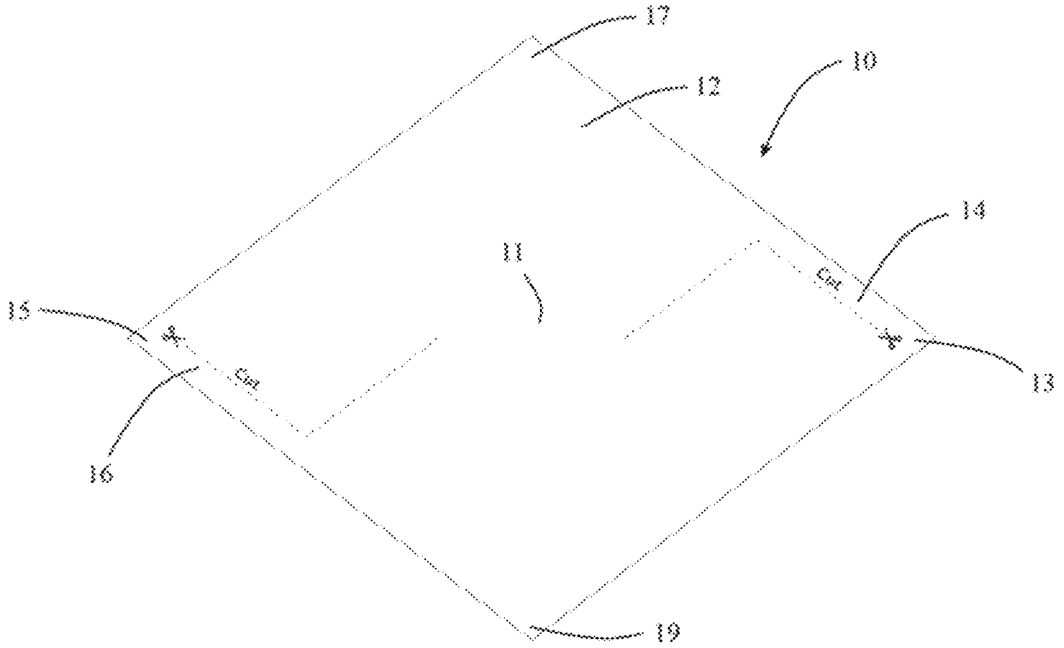
FIG. 1 is an elevation view of a substantially square sheet of material illustrating a first step in construction of a discard pouch in accordance to one, or more embodiments.

Referring initially to FIG. 1 a sheet of a preferred embodiment of a discard pouch 10 is illustrated. The preferred orientation and direction of the elements of this embodiment of a discard pouch 10 is described relative to this figure. A packaging system for distributing a product including a plurality of individual pieces, each individual piece having a consumable portion and a disposable portion 10, the system comprising a container encompassing the product (not shown), and a semi-stiff foldable substrate coupled to or housed within the container, wherein the substrate is scored to allow a user to fold the substrate into a desired three-dimensional pattern that is configured to accommodate the disposable portions. The container is a bag (not shown) and the substrate is housed within the bag and wherein the container is a bag and the bag includes a separate pocket that encloses the substrate 12.

A flexible substrate or semi-stiff 12 can have a center 11 and a first pair of opposing corners, first (right) corner 13, and second (left) corner 15, a third (top) corner 17 a fourth (bottom) corner 19, and a front side 23 and a back side 25 (shown in FIG. 3) and can be configured to accommodate a disposable portions, which can be seeds, or other shelled snacks. A first step in the construction of a discard pouch comprises a first cut 14 extending from substantially near the first corner 13 towards the third corner 17 and just before reaching the center 11 the first cut extends towards the center forming an L-shape. A second cut 16 extending from substantially near the second corner 15 towards the fourth corner 19 and before reaching the center 11 the second cut extends towards the center forming an L-shape. In the preferred embodiment, the sheet 12 is made of paper, laminated substrate, cardstock, or like.

Figure 2:
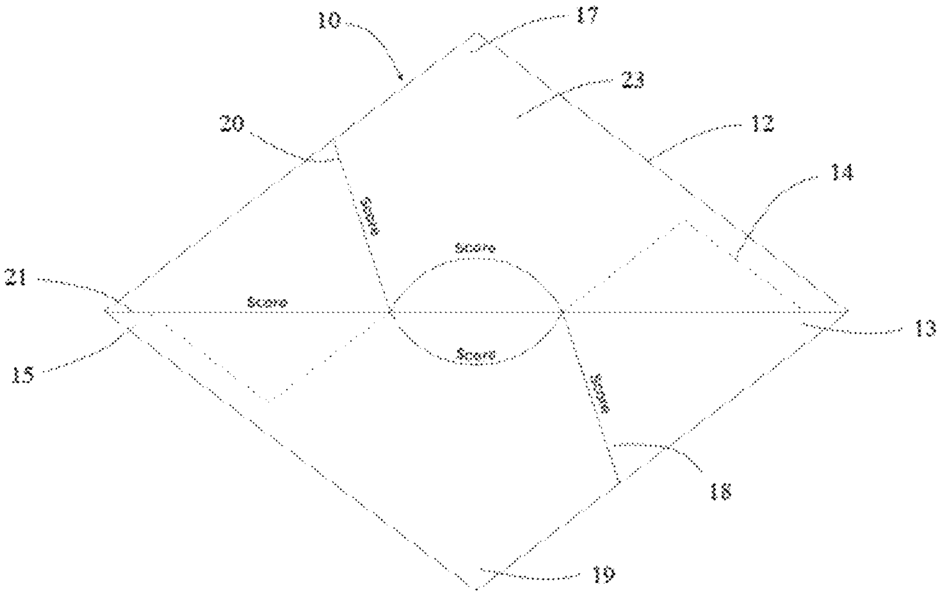
FIG. 2 is a plan view illustrating a second step in construction of a discard pouch in accordance to one, or more embodiments.

Referring to FIG. 2, a second step in the construction of a discard pouch 10 is illustrated. In this step, the sheet 12 is scored in two locations having a first score 18 and a second score 20. The first score line 18 and second score line 20 may be located anywhere in the vicinity of the location shown in FIG. 2. The first score line 18 can approach and touch the end of the first cut 14 and the second score 20 can approach and touch the second cut 16 and both can continue around the center 11 forming a J-shape. The first score line 18 can be between the first corner 13 and the fourth corner 19 and can be substantially closer to the fourth corner. The second score line 20 can be between the third corner 17 and the second corner 15 and can be substantially closer to the third corner. A third score line 21 can be made from the second corner 15 through the middle of the flexible substrate 12 to the first corner 13.

Figure 3:
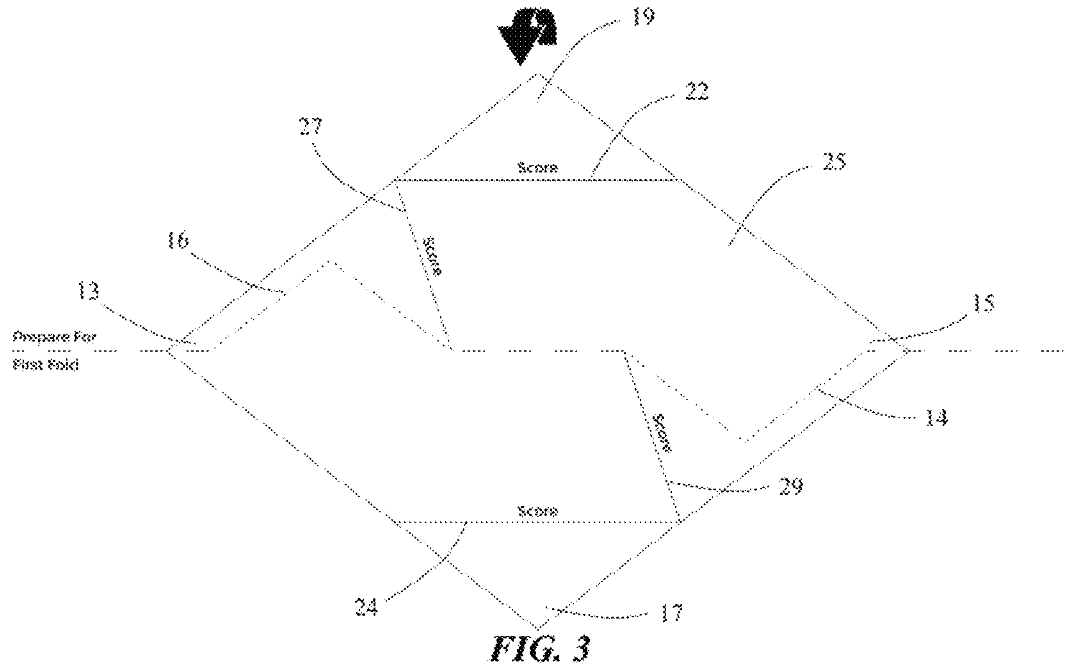
FIG. 3 is a plan view illustrating a third step in construction of a discard pouch in accordance to one, or more embodiments.

Referring to FIG. 3, a third step in the construction of the discard pouch 10 is illustrated. In this step, the flexible substrate 12 is flipped over showing the back side 25 and a fourth score line 22, a fifth score line 24, a sixth score line 27, and seventh score line 29. The fourth score line 22 can be on or near the fourth corner 19 and the fifth score line 24 can be on or near the third corner 17 creating a triangular shape on the third corner and fourth corner. The seventh score line 29 can substantially reach from the fifth score line 24 to the first cut 14, and the sixth score line 27 can substantially reach from the fourth score line 22 to the second cut 16. A person skilled in the art would understand that fourth score line 22, a fifth score line 24, a sixth score line 27, and seventh score line 29 may be located anywhere in the vicinity of the location shown on FIG. 3 to accomplish the purpose of this embodiment of the invention.

Figure 4:
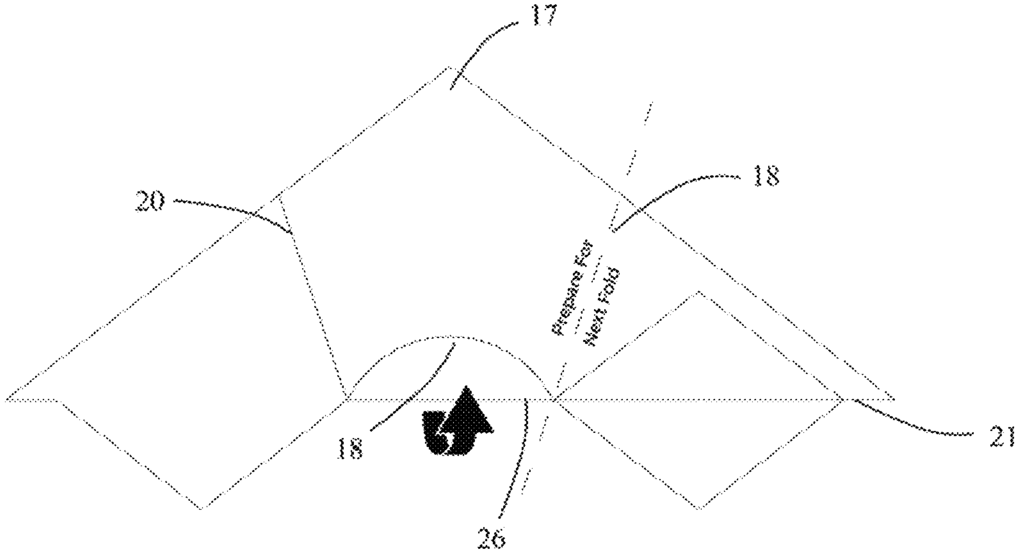
FIG. 4 is a plan view illustrating a fourth step in construction of a discard pouch in accordance to one, or more embodiments.

Referring to FIG. 4, a fourth step in the construction of the discard pouch 10 is illustrated. In this step, the flexible substrate 12 is folded in half toward the user along the third score line 21 showing the first score line 18. A bottom 26 of the discard pouch 10 is formed by folding the flexible substrate 12 in half. Alternatively, the bottom can be folded the opposite direction creating the same pocket for the bottom for the discard pouch 10. A person skilled in the art would understand that bottom 26 may be located anywhere in the vicinity of the location shown on FIG. 4 to accomplish the purpose of this embodiment of the invention.

Figure 5:
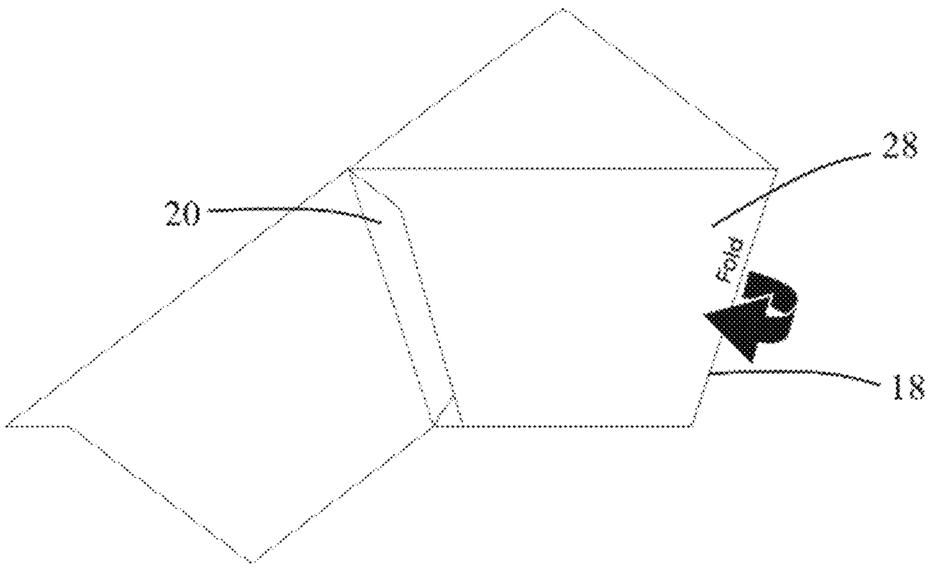
FIG. 5 is a plan view illustrating a fifth step in construction of a discard pouch in accordance to one, or more embodiments.
Figure 6:
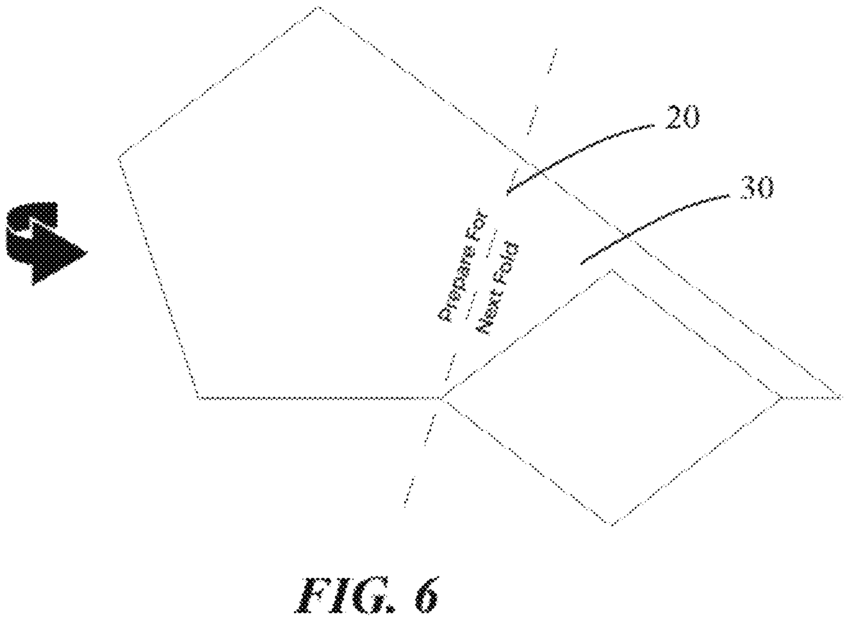
FIG. 6 is a plan view illustrating a sixth step in construction of a discard pouch in accordance to one, or more embodiments.

Referring to FIGS. 5-6, a fifth and sixth step in the construction of the discard pouch 10 is illustrated. In the fifth step, a first wall 28 is created by folding inward along the first score line 18. In the sixth step, the discard pouch 10 is rotated 180 degrees preparing for the next fold along the second score line 20. Alternatively, the fold can be along the first score 18 in the opposite direction of the fold in the fifth step. A person skilled in the art would understand that first wall 28 may be located anywhere in the vicinity of the location shown on FIG. 5 to accomplish the purpose of this embodiment of the invention.

Figure 7:
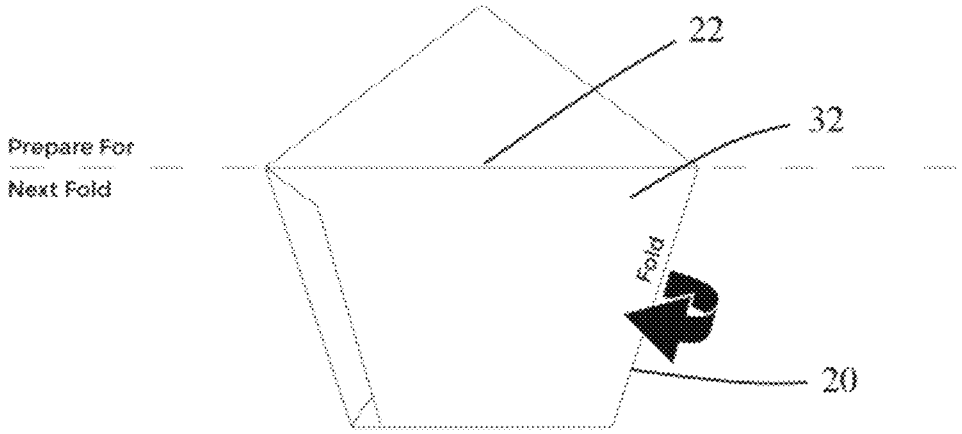
FIG. 7 is a plan view illustrating a seventh step in construction of a discard pouch in accordance to one, or more embodiments.
Figure 8:
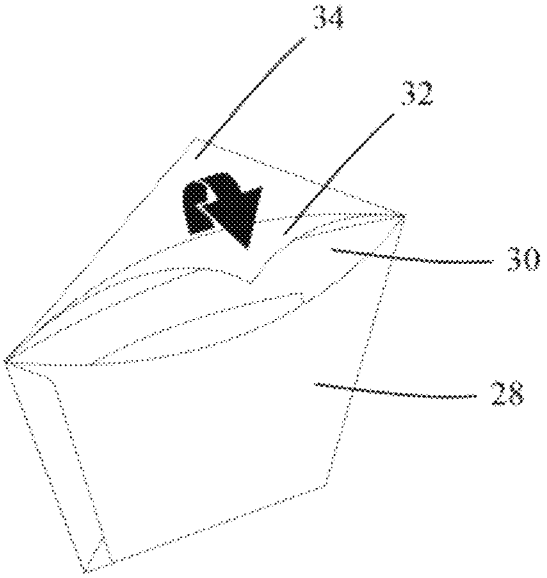
FIG. 8 is a plan view illustrating an eight step in construction of a discard pouch in accordance to one, or more embodiments
Figure 9:
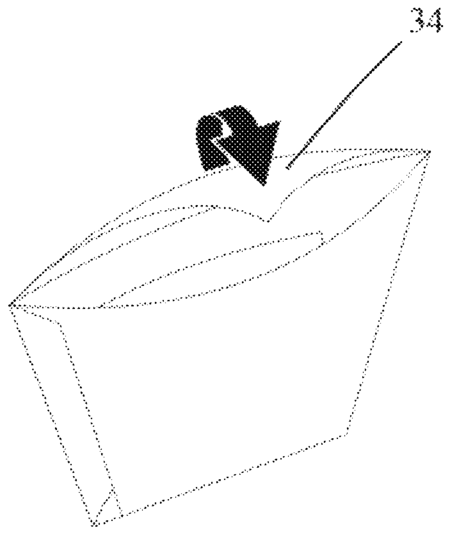
FIG. 9 is a plan view illustrating a night step of a discard pouch in accordance to one, or more embodiments.

Referring to FIGS. 7-9, a seventh, eighth and ninth step in the construction of the discard pouch 10 is illustrated. In the seventh step, a second wall 30 is created by folding inward along the second score line 20. The discard pouch 10 first wall 28, second wall 30, and bottom 26 are formed creating a pouch. A front flap 32 can be folded into the pouch created by the first wall 28 and the second wall 30. The discard pouch 10 can be flipped over and a second flap 34 can be folded into the pouch created by the first wall 28 and the second wall 30. A person skilled in the art would understand that second wall 30 and the flap 32 may be located anywhere in the vicinity of the location shown on FIGS. 8 and 9 to accomplish the purpose of this embodiment of the invention.

Figure 10:
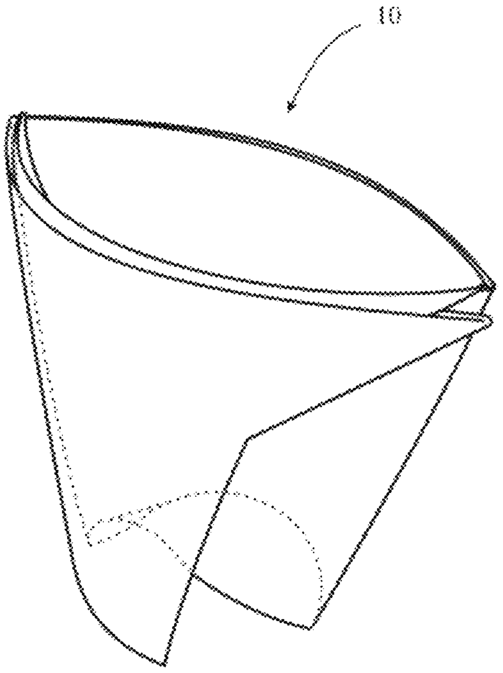
FIG. 10 is a plan view of a discard pouch in accordance to one, or more embodiments.

Referring to FIG. 10, a completed discard pouch 10 is illustrated ready for use.

Figure 11:
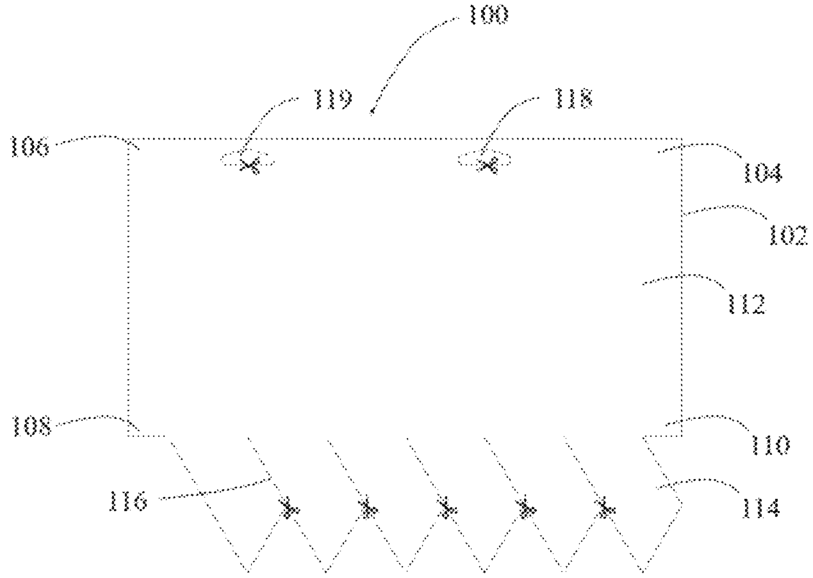
FIG. 11 is an elevation view of a substantially square sheet of material illustrating a first step in another embodiment of a construction of a discard pouch in accordance to one, or more embodiments.

Referring to FIG. 11, shows another embodiment in the construction of a discard pouch 100, a first step in the construction of the discard pouch 100 is illustrated. The preferred orientation and direction of the elements of this embodiment of the discard pouch 100 is described relative to this figure. In this step, a flexible substrate 102 can have a first pair of opposing corners, first corner (top right) 104, and second corner (top left) 106, a third corner (bottom left) 108, a fourth corner (bottom right) 110, and a front side 112 and a back side 116 (shown in FIG. 13). At least five diagonals cuts 116 are made as shown in FIG. 11 forming six diagonal columns 114. A sunflower pouch seed 100 can further comprise a first tab 114 and a second tab 115 wherein the tabs can be circular, triangular, slots, or the like wherein the first tab and the second tab are cut substantially near the top of the flexible substrate 102.

Figure 12:
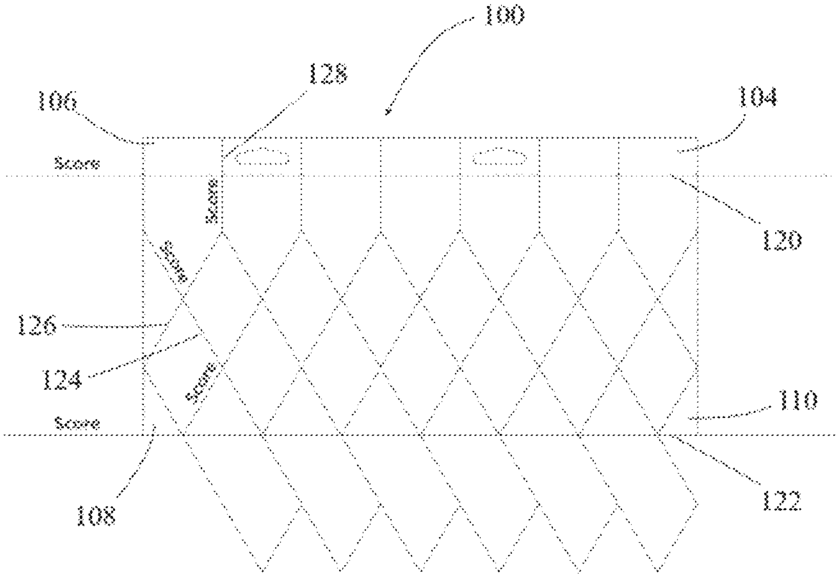
FIG. 12 is a plan view illustrating a second step of another embodiment in construction of a discard pouch in accordance to one, or more embodiments.

Referring to FIG. 12, a second step in the construction of the discard pouch 10 is illustrated. In this step, a first score line 120 can be scribed substantially near the top of the first corner 104, and the second corner 106, a second score line 122 can be where the diagonal columns 114 meet the main body of the flexible substrate 102. At least eight third score lines 124 are sketched along the substantially same line as the columns 114 and at least eight fourth score lines 126 running substantially diagonal to the third score lines wherein the third score line and the fourth score line can meet at the second score line 122 at the diagonal column 114 in at least seven locations. At least six fifth score lines 128 can run vertical from the top of the third score line 124 and the fourth score line 126 to the top of the flexible substrate. A person skilled in the art would understand that first score line 120, second score line 122, third score line 124, fourth score line 126, and fifth score line 128 may be located anywhere in the vicinity of the location shown on FIG. 12 to accomplish the purpose of this embodiment of the invention.

Figure 13:
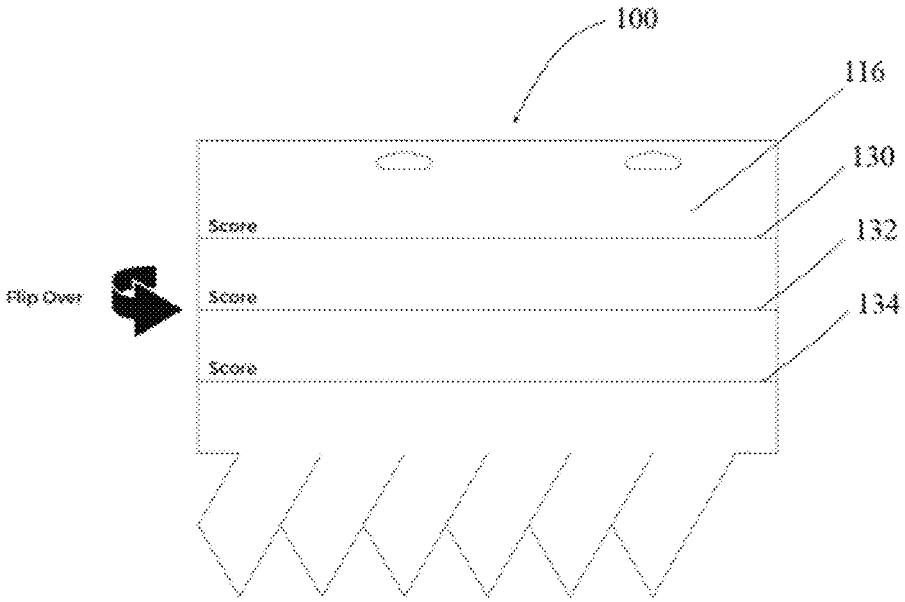
FIG. 13 is a plan view illustrating a third step of another embodiment in construction of a discard pouch in accordance to one, or more embodiments.

Referring to FIG. 13, a third step in the construction of the discard pouch 100 is illustrated. In this step, the flexible substrate 102 is flipped over to the back side 116 and a sixth score line 130, a seventh score line 132, and an eighth score line 134 are horizontal and spaced as shown in FIG. 13.

Figure 14:
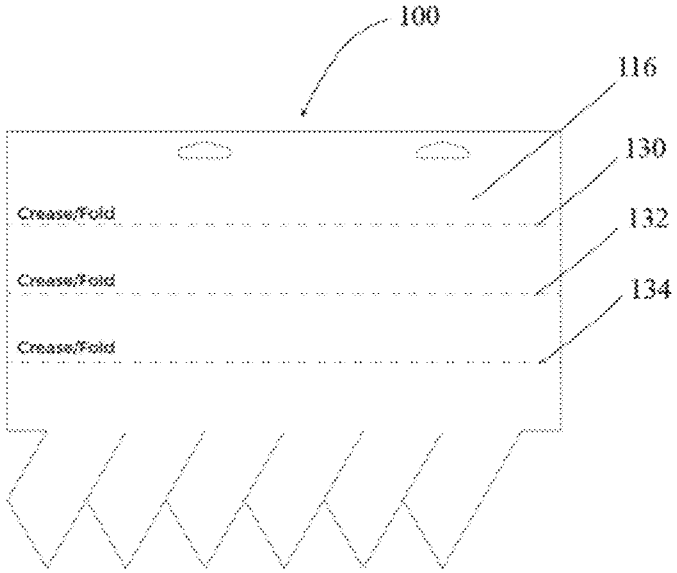
FIG. 14 is a plan view illustrating a fourth step of another embodiment in construction of a discard pouch in accordance to one, or more embodiments.

Referring to FIG. 14, a fourth step in the construction of the discard pouch 100 is illustrated. In this step, the scores made in the third step, the sixth score line 130, the seventh score line 132, and the eighth score line 134, are creased and folded along the score lines. A person skilled in the art would understand that creasing and folding of may be located anywhere in the vicinity of the location shown on FIG. 14 to accomplish the purpose of this embodiment of the invention.

Figure 15:
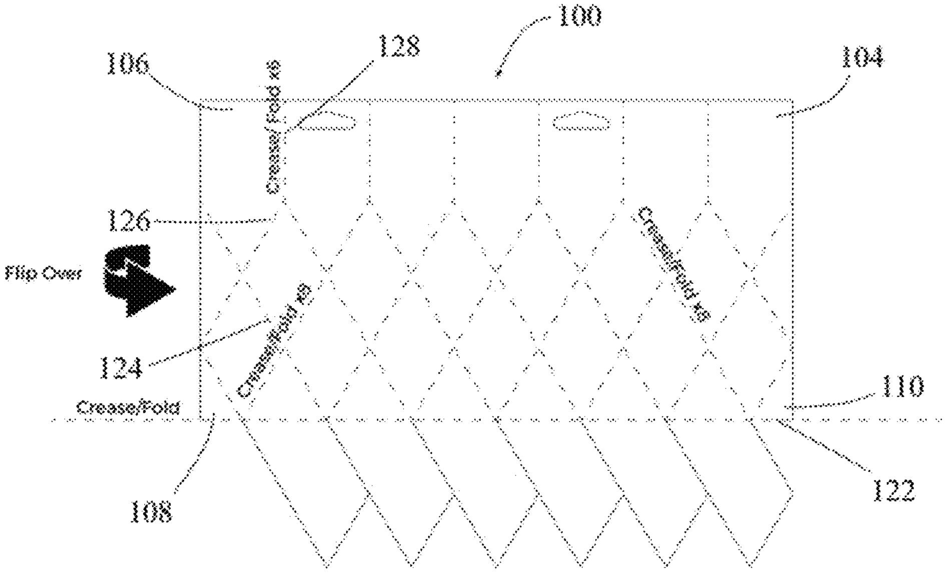
FIG. 15 is a plan view illustrating a fifth step of another embodiment in construction of a discard pouch in accordance to one, or more embodiments.

Referring to FIG. 15, a fifth step in the construction of the discard pouch 100 is illustrated. In this step, the flexible substrate 102 is rotated back to the front showing the front side 112. The first score line 120, the second score line 122, third score lines 124, fourth score lines 126, and fifth score lines 128 can be creased and folded along the score lines. A person skilled in the art would understand that creasing and folding of first score line 120, the second score line 122, third score lines 124, fourth score lines 126, and fifth score lines 128 may be located anywhere in the vicinity of the location shown on FIG. 15 to accomplish the purpose of this embodiment of the invention.

Figure 16:
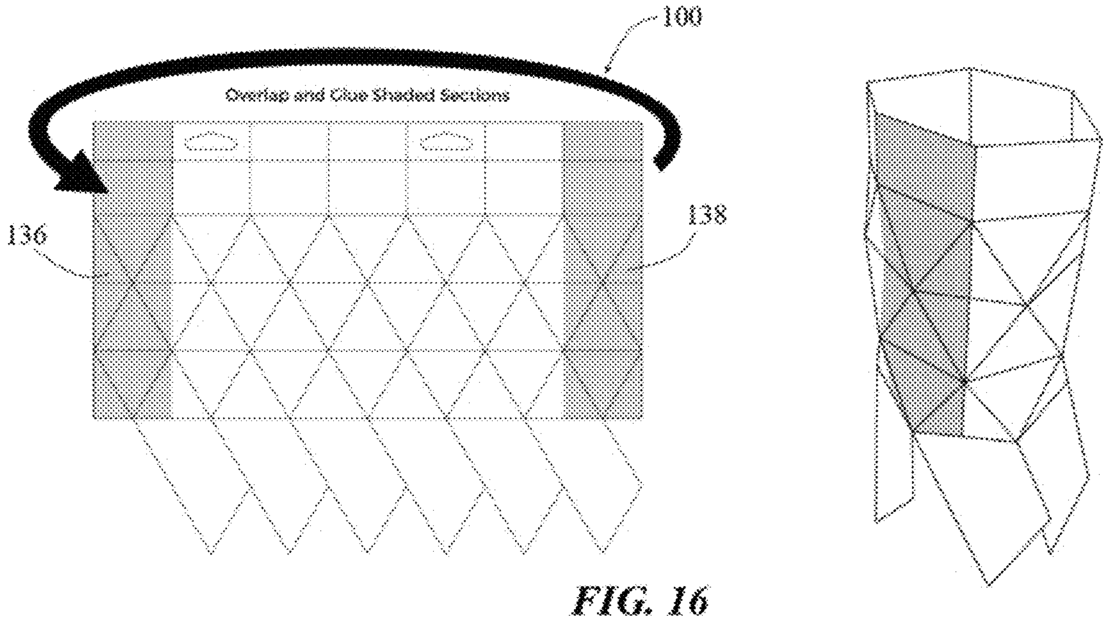
FIG. 16 is a plan view illustrating a sixth step of another embodiment in construction of a discard pouch in accordance to one, or more embodiments.
Figure 17:
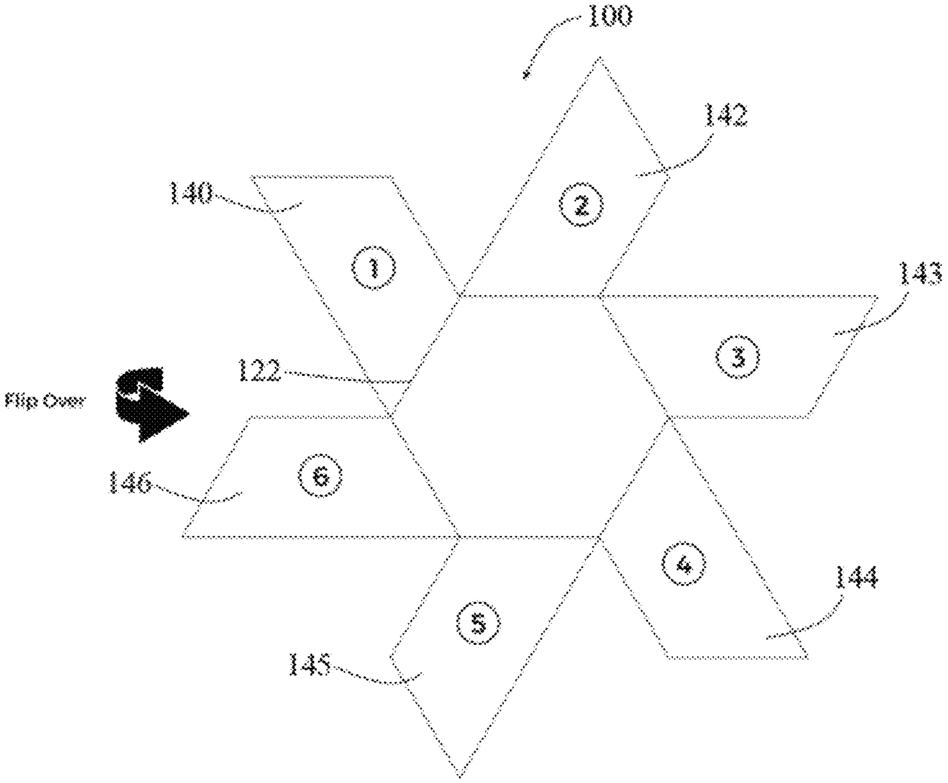
FIG. 17 is a plan view illustrating a seventh step of another embodiment in construction of a discard pouch in accordance to one, or more embodiments.
Figure 18:
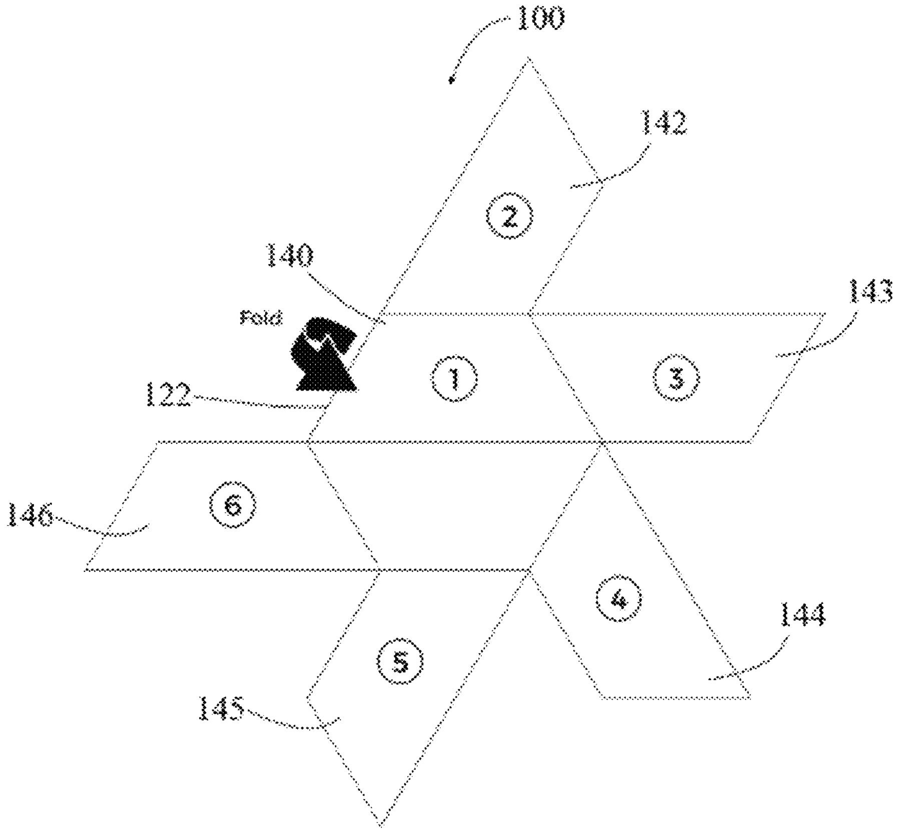
FIG. 18 is a plan view illustrating a eighth step of another embodiment in construction of a discard pouch in accordance to one, or more embodiments.
Figure 19:
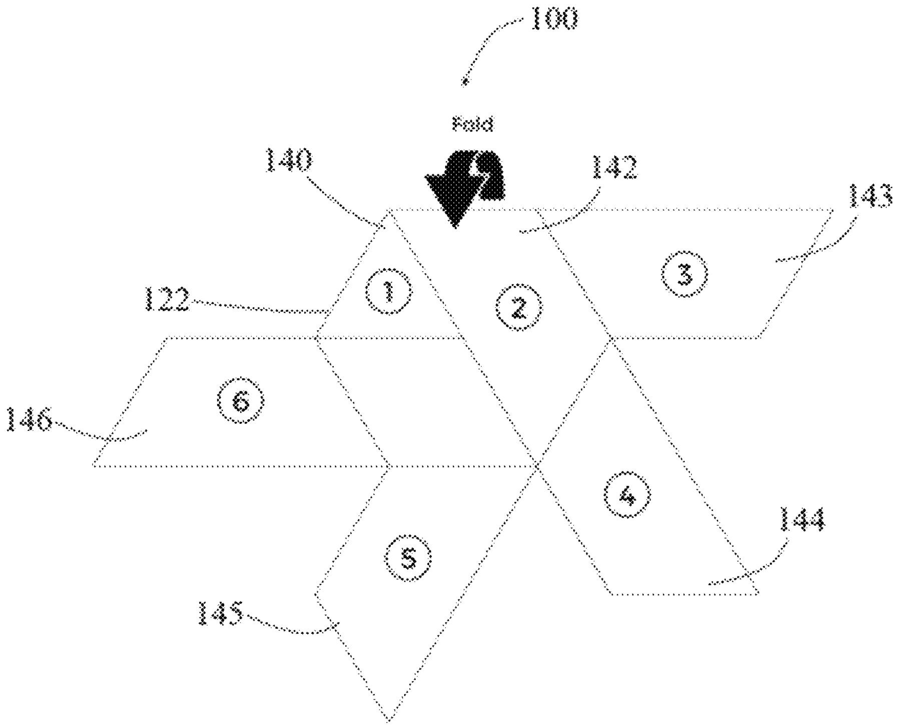
FIG. 19 is a plan view illustrating a ninth step of another embodiment in construction of a discard pouch in accordance to one, or more embodiments.
Figure 20:
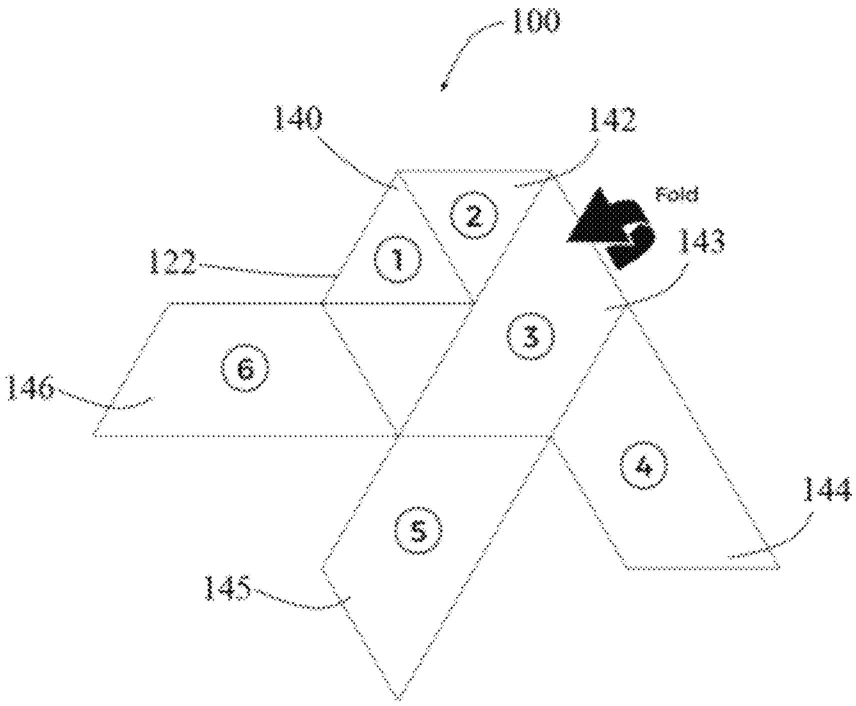
FIG. 20 is a plan view illustrating a tenth step of another embodiment in construction of a discard pouch in accordance to one, or more embodiments.
Figure 21:
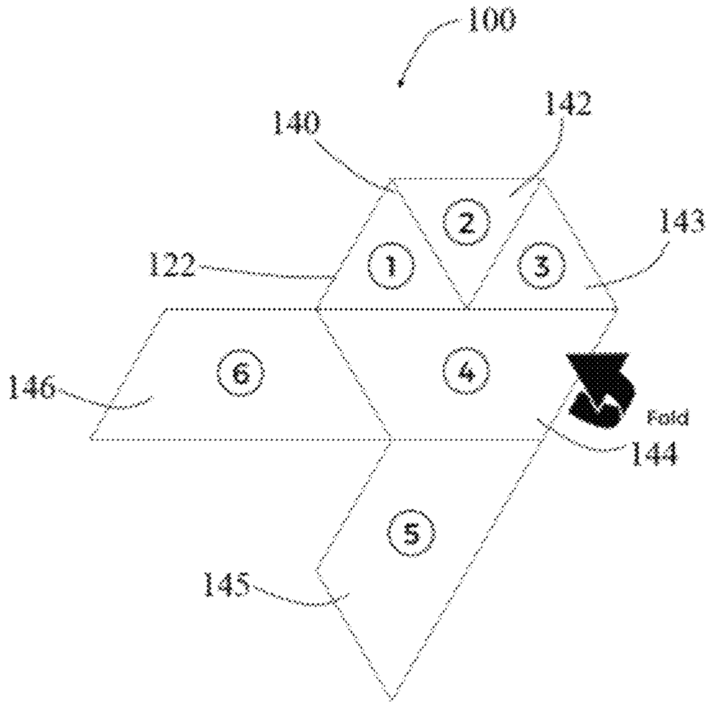
FIG. 21 is a plan view illustrating a eleventh step of another embodiment in construction of a discard pouch in accordance to one, or more embodiments.
Figure 22:
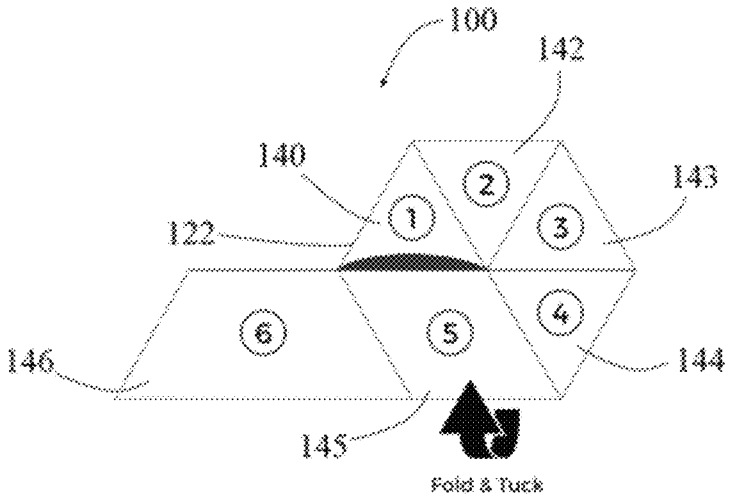
FIG. 22 is a plan view illustrating a twelfth step of another embodiment in construction of a discard pouch in accordance to one, or more embodiments.
Figure 23:
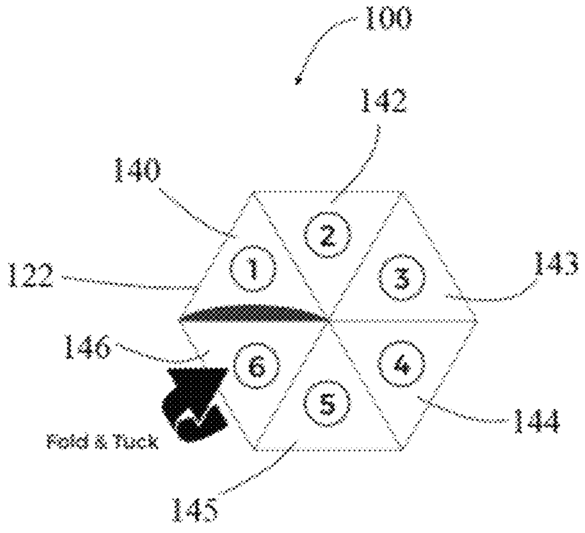
FIG. 23 is a plan view illustrating a thirteenth step of another embodiment in construction of a discard pouch in accordance to one, or more embodiments.

Referring to FIG. 16, a sixth step in the construction of the discard pouch 100 is illustrated. In this step, the flexible substrate ends are overlapped and glued on the first area 136, and the second area 138 as shown in FIG. 16. A person skilled in the art would understand that first area 136, and the second area 138 may be located and glued anywhere in the vicinity of the location shown on FIG. 16 to accomplish the purpose of this embodiment of the invention.

Referring to FIGS. 17-23, a seventh through thirteenth steps in the construction of the discard pouch 100 is illustrated. In step six, the flexible substrate is flipped so that the bottom is shown and each of the six columns 112 are shown and the columns are labeled one through six. In step seven, column one 140 is folded along the second score line 122. In step eight, column two 142 is folded along the second score line 122 over column one 140. In step nine, column three 143 is folded along the second score line 122 over column two 142. In step ten, column four 144 is folded along the second score line 122 over column three 143. In step eleven, column five 145 is folded along the second score line 122 over column four 144 and tucked under column four 144. In step twelve, column six 146 is folded along the second score line 122 over column five 145 and tucked under column one 140 and column two 142.

Figure 24:
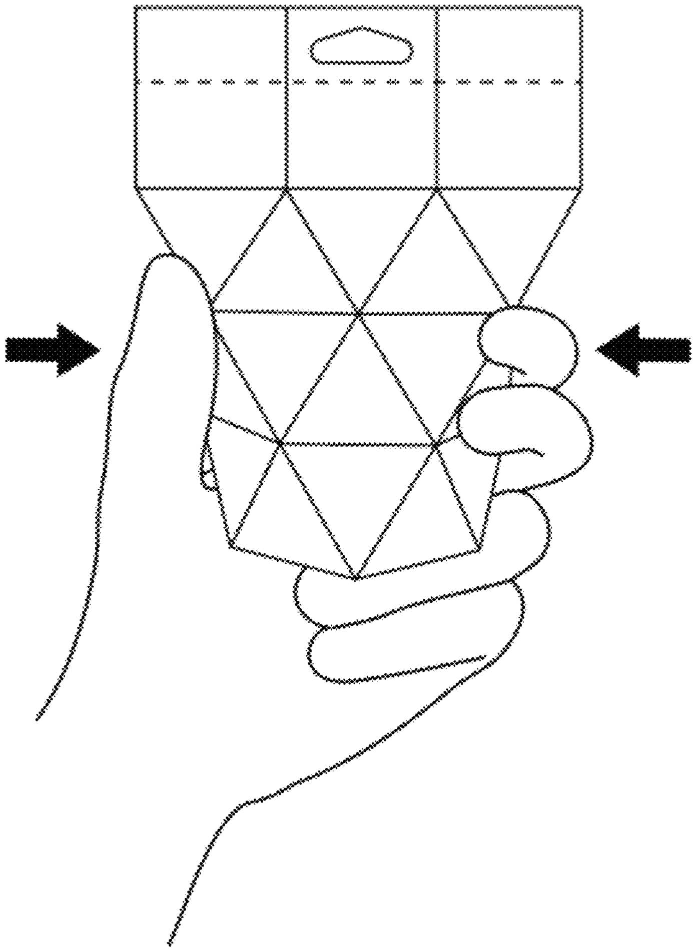
FIG. 24 is a plan view of another embodiment ready for use of a discard pouch in accordance to one, or more embodiments.

Referring to FIG. 24, a completed discard pouch 100 is illustrated ready for use.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

We claim:

1. A packaging system for distributing a product including a plurality of individual pieces, each individual piece having a consumable portion and a disposable portion, the system comprising:

a container encompassing the product; and a semi-stiff foldable substrate coupled to or housed within the container, wherein the substrate is scored to allow a user to fold the substrate into a desired three-dimensional pattern that is configured to accommodate the disposable portions;

wherein the substrate is substantially square and comprises a first corner and a second corner opposed to the first corner at least one slot and at least one tab, wherein the tab inserts into the slot when the substrate is folded in the desired three-dimensional pattern and holds the substrate in the desired three-dimensional pattern;

wherein the slot and tab are defined by a first cut near the first corner and a second cut near the second corner; and wherein the first cut and the second cut are L-shaped and allow a user to fold the substrate into the desired three-dimensional pattern.

2. The packaging system according to claim 1, wherein the substrate is paper, laminated material, or cardstock.

3. The packaging system according to claim 1, wherein the container is a bag and the substrate is housed within the bag.

4. The packaging system according to claim 1, wherein the container is a bag and the bag includes a separate pocket that encloses the substrate.

5. The packaging system according to claim 1, wherein the substrate comprises a glue portion configured to hold the substrate in the desired three-dimensional pattern when the substrate is folded.

6. The packaging system according to claim 1, wherein the first cut is a mirror image of the second cut.

7. The packaging system according to claim 1, wherein the first cut is a mirror image of the second cut.

8. The packaging system according to claim 1, wherein the substrate is scored with a first score line that abuts the first cut and a second score line that abuts the second cut.

9. The packaging system according to claim 8, wherein the first score line and the second score line are substantially J-shaped.

* * * * *